US005281768A

United States Patent [19]

Sawada et al.

[11] Patent Number: 5,281,768

[45] Date of Patent: Jan. 25, 1994

[54] SUSPENSION-TYPE LINE ARRESTER

[75] Inventors: Jun Sawada, Musashino; Takeshi Yamada, Komae; Hiroshi Hirako, Ichinomiya; Toshiyuki Takagi, Komaki, all of Japan

[73] Assignees: Tokyo Electric Power Company, Incorporated, Tokyo; NGK Insulators, Ltd., Nagoya, both of Japan

[21] Appl. No.: 794,141

[22] Filed: Nov. 19, 1991

[30] Foreign Application Priority Data

Nov. 21, 1990 [JP] Japan ................................ 2-318342

[51] Int. Cl.[5] ........................ H01B 17/20; H02H 1/04

[52] U.S. Cl. ............................ 174/194; 174/182/185; 174/186; 174/141 R; 174/140 R; 361/126

[58] Field of Search ............... 174/194, 180, 181, 182, 174/184, 185, 186, 188, 190, 208, 140 R, 141 R, 139; 361/126, 127; 338/21

[56] References Cited

FOREIGN PATENT DOCUMENTS 0183015 7/1989 Japan ............................. 174/140 R
0183016 7/1989 Japan ............................. 174/140 R

*Primary Examiner*—Leo P. Picard
*Assistant Examiner*—Hyung S. Sough
*Attorney, Agent, or Firm*—Shea & Gould

[57] ABSTRACT

An insulator for use in a suspension-type line arrester that supports a transmission line is disclosed. Such line arresters have a plurality of insulators connected in a string. The insulators have linking members configured to prevent relative rotation between adjacent insulators in the line arrester's insulator string.

10 Claims, 3 Drawing Sheets

SUSPENSION-TYPE LINE ARRESTER

This application claims the priority of Japanese Patent Application No. 2-318342 filed on Nov. 21, 1990 which is incorporated herein by reference.

BACKGROUND OF THE INVENTION

1. Field of the Invention

The present invention relates to a suspension-type line arrester. More particularly, this invention pertains to a suspension-type line arrester which grounds the surge current generated by lightning strike in transmission lines. The line arrester also promptly cuts off the follow current to prevent ground faults.

2. Description of the Related Art

Generally, surge absorbing devices are provided on transmission lines to absorb any switching surge currents generated by opening or closing of the circuit breaker and any lightning surge currents generated by a lightning strike. Surge absorbing devices prevent ground faults. Conventional arresters do not make suitable surge absorbing devices for transmission lines, because their structure have limited endurance for the line load.

If a conventional arrester is provided on transmission lines, it influences the complex design of the transmission tower and the insulating devices which support the transmission lines. Therefore, a suspension-type line arrester has been proposed for arresting, insulating and supporting transmission lines.

The body of the proposed line arrester has an integrally formed head and shed structure. The shed is formed about the head. A metal pin within the head. A metal cap is installed at the top of the head. The pin and the cap are aligned along the center axis of the insulator body. They are insulated from each other by the insulator body. Bore holes are constructed within the shed. Several resistors having nonlinear varistor voltage-current characteristics are accommodated in each bore hole.

A conductive seal is provided at each vertical end of the bore hole. The resistors are supported within each bore hole by the top and bottom seals. Each top seal is connected to the cap by a connector, and each bottom seal is connected to the pin by a wire.

The pin is a ball type pin. Therefore, the pin base has a larger diameter than that of the pin body. The cap is a socket type cap with an opening formed on the top portion of the cap. The opening opens to the side and therefore, the pin base of the adjoining insulator can be horizontally inserted into the opening.

Once the pin base of a first insulator is engaged with the opening of the cap of a second insulator, the two insulators can not be vertically separated from each other. An insulator string is constructed by linking several insulators. The transmission lines are suspended from the tower by the insulator strings.

In the event of a lightning strike, a large surge current flows from a tower to the transmission lines or from a transmission line to a tower by way of insulator strings. In each insulator, the surge current flows through the route sequentially set by a pin, a wire, a bottom seal, resistors, a top seal, a connector and a cap.

Conventional insulators can rotate relative to their adjacent (upper and lower) insulators around the center axis of the insulator string. Accordingly, even though each insulator is mounted so that resistors of the vertically linked insulators are aligned in a vertical direction, swaying in the transmission lines can cause misalignments between the resistors of the upper insulator and the resistors of the lower insulator.

When the energy of the surge is over the capacity of the resistor, the resistors break down due to the excess surge current and become conductive. Then, an arc discharge will occur directly between the resistors of the upper insulator and the resistors of the lower insulator. If the resistors are misaligned, the course of the arc discharges are in a zigzag manner along the insulator string. Such an arc discharge pattern damages the surface of the sheds of the insulators.

SUMMARY OF THE INVENTION

Accordingly, it is a primary objective of the present invention to provide a suspension-type line arrester which can be prevented from rotating relatively to an adjoining insulator to maintain the alignment of the resistors.

To achieve the foregoing and other objects and in accordance with the purpose of the present invention, an improved insulator is provided for use in a suspension-type line arrester that supports a transmission line. Such line arresters have a plurality of insulators connected in a string. The insulator includes a body, a resistor and a connecting apparatus for connecting the insulators with each other. The body has a head and a shed formed integrally with the head. The shed has at least one bore hole in which resistors are accommodated.

The connecting apparatus has a first linking member provided substantially at the center of the shed and projecting downwards and a second linking member provided at the top of the head. When a plurality of insulators are connected in a string, the first link in of a first one of the connected insulators is arranged to engage the second linking member of an adjacent (second) one of said connected insulators. The linking members are designed to prevent relative rotation between the first and second insulators.

BRIEF DESCRIPTION OF THE DRAWING

The features of the present invention that are believed to be novel are set forth with particularity in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENTS

The preferred embodiment of the present invention will now be described referring to the accompanying drawings.

Figure 1:
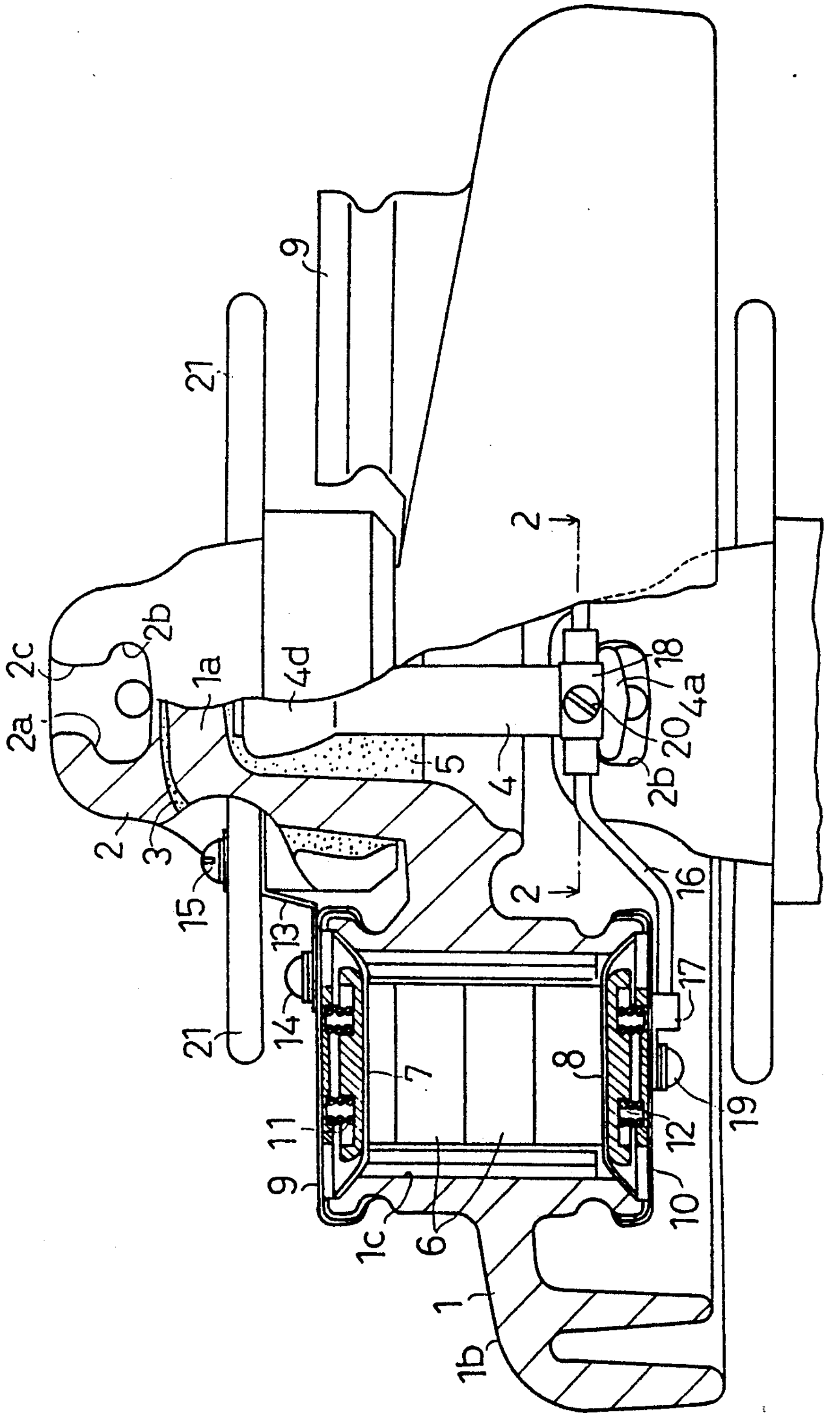
FIG. 1 is a longitudinal half cross sectional view of a suspension-type line arrester formed in accordance with the present invention.

As shown in FIG. 1, a metal cap 2 is securely fixed on a head 1*a* of an insulator body 1 by cement 3. A pin head 4*d* is fixed within the head la of the body 1 by cement 5.

The pin head 4*d* and the pin base 4*a* are larger in diameter than the pin body.

Figure 2:
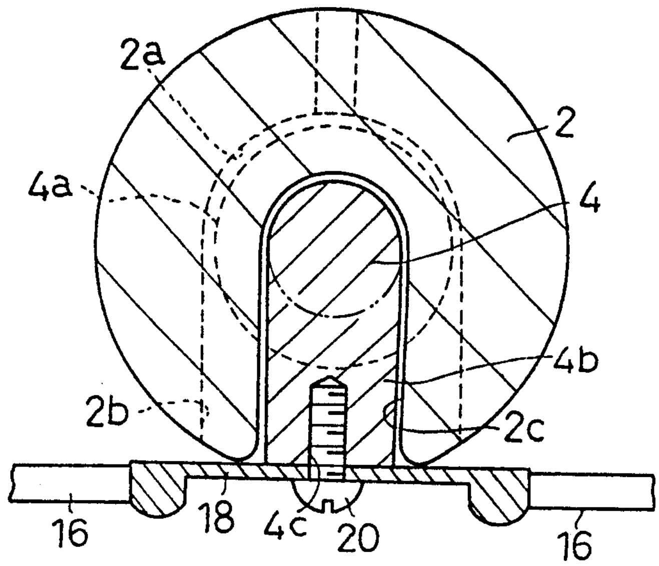
FIG. 2 is a cross sectional view taken along 2—2 line in FIG. 1.

As shown in Figs. 1 and 2, the upper section of the cap 2 has an opening 2*a*, which receives a pin base 4*a* of an upper adjoining insulator. For that purpose, the opening 2*a* has an enlarged recess 2*b*, which horizontally receives the pin base 4*a*. The opening 2*a* has a mouth 2*c* in the upper portion of the opening 2*a*, which the body of the pin 4 can pass through. The width of the pin mouth 2*c* is set narrower than that of the enlarged recess 2*b*.

Figure 3:
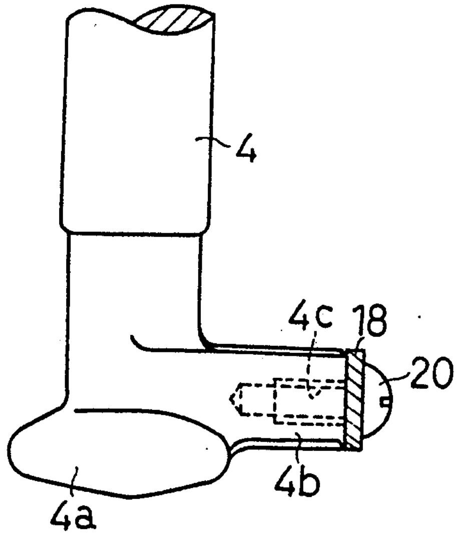
FIG. 3 is an enlarged side view of a metal pin.

As shown in FIGS. 2 and 3, an arm 4*b* is formed integrally with 11, the pin 4. The arm 4*b* of the pin 4 engages the mouth 2*c* to prevent relative rotation between the cap 2 and the pin 4. The head segment of the arm 4*b* has a hole 4*c*.

As shown in FIG. 1, the insulator body 1 has a shed 1*b*. A pair of bore holes 1*c* are formed in the shed 1*b*. Bore holes 1*c* angularly spaced by 180 degrees. The opening direction of the enlarged recess 2*b* is perpendicular to the line that connects the bore holes 1*c*.

Several resistors 6 are accommodated in each bore hole 1*c*. The resistors 6 are made of sintered material consisting essentially of zinc oxide and other metal oxides. The resistors 6 have non-linear varistor voltage-current characteristics.

An upper inner seal 7 and a lower inner seal 8 are respectively provided on the upper and lower sections of each bore hole 1*c*. The resistors 6 are sealed in each bore hole 1*c* by the upper inner seal 7 and the lower inner seal 8. An upper outer seal 9 is attached at the upper portion of each bore hole 1*c*. A lower outer seal 10 is attached at the lower portion of each bore hole 1*c*. Upper inner seal 7, lower inner seal 8, upper outer seal 9 and lower outer seal 10 have a function of being electrodes.

A conductive coupler 11 bridges the upper inner seal 7 and the upper outer seal 9, and also a conductive coupler 12 bridges the lower inner seal 8 and the lower outer seal 10. Each conductive coupler 11,12 electrically couples its corresponding inner and outer seal portions.

The upper outer seal 9 is connected to the cap 2 by a connector 13. One end of the connector 13 is fastened to the upper outer seal 9 by a coupling pin 14, and the opposite end of the connector 13 is fastened to the cap 2 by a screw 15.

A wire 16 couples an underside of the lower outer seal 10 and the pin 4. Both ends of the wire 16 have a connector 17,18 clamped thereon. The connector 17 is fixed to the lower outer seal 10 by a coupling pin 19, to connect the wire 16 to the lower outer seal 10. The second end of wire 16 is secured to the pin 4 by a screw 20, which also screws down the connector 18 through the hole 4*c* of the arm 4*b*.

Arc guides 21 are fastened to the cap 2 such that they are parallel with the upper outer seals 9. In the event that an arc discharge occurs through a resistors 6, the direction of arc discharge is altered outward by the corresponding arc guide 21.

Figure 5:
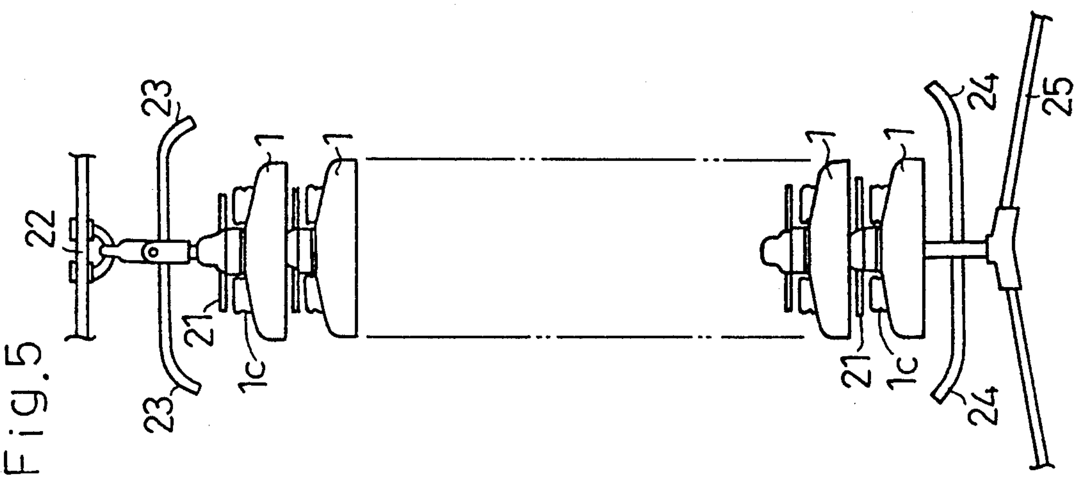
FIG. 5 shows an insulator string in use.
Figure 4:
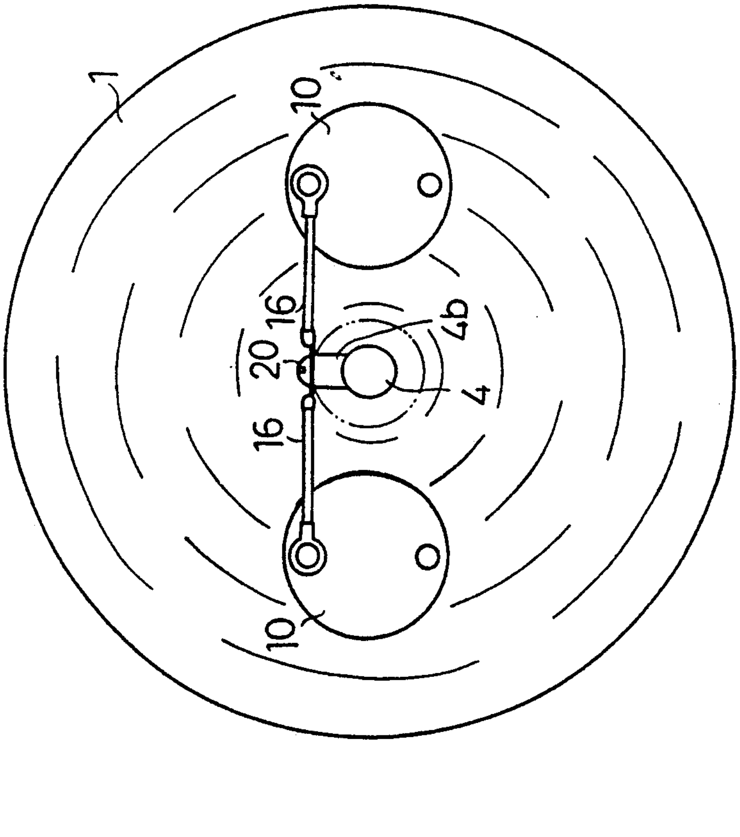
FIG. 4 is a bottom view of the insulator shown in FIG. 1.

As shown in FIG. 5, an insulator string consisting of linked insulators is suspended vertically from the tower arm 22. For A each adjacent pair of insulators, the pin base 4*a* of the upper insulator engages the opening 2*a* of the cap 2 of the lower insulator. The insulators are arranged such that their resistors 6 are vertically aligned.

A transmission line 25 is suspended from a tower arm 22 by the insulator string. Arcing horns 23,24 are connected at the upper and lower end of an insulator string. The arcing horns 23,24 prevent an arc from discharging along the side surface of the insulator string.

The operation of the line arrester will be described below. For the purposes of this description, it will be assumed that the line arrester is connected as shown in FIG. 5, and a lightning surge in transmission line 25 is received by the most bottom pin 4.

The lightning surge passes through the wire 16, the lower outer seal 10, the conductive coupler 11, the lower inner seal 8, the resistors 6, the upper inner seal 7, the conductive coupler 11, the upper outer seal 9, the connector 13 and the cap 2 in the bottom insulator. The lightning surge then passes to the next insulator connected directly above the bottom insulator through the pin 4. By following the same path in each insulator, the surge current is guided to the cap 2 of the upper most insulator. The surge is then grounded through the tower arm 22, the tower and to the ground. After discharging, the resistors 6 cut off the follow current generated in the insulator string to prevent ground faults.

At times, it is possible that the insulators will be subjected to an unexpectedly large surge that is greater than the capacity of the insulator. This may be due to a wide variety of factors. For example, the resistors sometimes decay as a result of long term use. The resistors 6 and seals 7,8,9 and 10 are heated up exceedingly by the unsuspected large surge. In a worst case, the seals 7,8,9 and 10 might be blown off due to the high internal pressure of the bore hole 1*c* generated by over heating.

In each of the above cases, the arc passing through each bore hole 1*c* is directed toward the side of the insulator bodies 1 by the arc guide 21 and is led to a region between the arcing horns 23,24. Because of this operation, the unexpected arcing surge is grounded by passing between arcing horns 23,24 and then to the tower and ground.

According to this embodiment, the arm 4*b* of the pin 4 situated on the upper one of two adjacent insulators engages the pin mouth 2*c* of the cap 2 situated on the lower insulator. Because the insulators are connected in this manner, the relative rotation of each insulator around the pin 4 is prevented. Therefore, the resistors 6 in adjacent insulators remain aligned at all times.

Therefore, even if the resistors of the upper and the lower insulator are broken down by the unexpected large lightning surge, the follow current is quickly transferred to between the arcing horns 23,24. Accordingly, discharging along the side surface of the insulator string is prevented. This prevents the shed 1*b* from fracturing due to arcing along the edge of the insulator.

In conventional line arresters, the metal pin and the lower outer seal are normally connected by a wire. Three different methods for connecting the wire with the pin are well known. In a first method, one end of the wire is directly fastened to the pin body by a screw. A second method contemplates connecting one end of a wire with a projection formed on the pin body. A third method contemplates directly welding one end of a wire to the pin surface.

According to this embodiment, a hole 4*c* is formed on the arm 4*b* of the pin 4. Thus, the wire 16 can be attached to the arm 4*b*. Therefore, in contrast to conventional type insulators, the suspension-type line arrester of the present invention does not require the fabrication of a special part to attach the wire 16. Rather, the wire 16 may be easily connected with the arm 4*b*. Such a simple structure contributes to lower the production cost for the line arrester.

Although only embodiment of the present invention has been described herein, it should be apparent to those skilled in the art that the present invention may be embodied in many other specific forms without departing from the spirit or scope of the invention.

For instance, the arm 4*b* of a metal pin 4 may be altered such that a bolt for attaching the wire is built into the pin 4. Alternatively, the hole 4*c* of the arm 4*b* can be altered such that it forms a hole in which the distal end of the wire 16 may be clamped.

Therefore, the present examples and embodiments are to be considered as illustrative and not restrictive and the invention is not to be limited to the details given herein, but may be modified within the scope of the appended claims.

We claim:

1. An insulator for use in a suspension-type line arrestor that supports a transmission line, the line arrestor having a plurality of said insulators connected in a string, the insulator comprising:
   a body having a head and a shed, wherein said shed is formed integrally with the head, and has a bore hole;
   a resistor accommodated in the bore hole; and
   connecting means for coupling the insulator to at least one adjacent insulator in the string, said connecting means having a first linking member provided substantially at the center of the shed and projecting downwards and a second linking member provided at the top of the head, and
   whereby when a plurality of said insulators are connected to form the string, the first linking member of a first one of said connected insulators is arranged to engage the second linking member of an adjacent, second one of said connected insulators in a manner that prevents relative rotation between the first and second insulators;
   wherein the first linking member is a metal pin, and the second linking member is a metal cap, and the metal pin includes a pin body, a base having a larger diameter than a diameter of the pin body and an arm that extends laterally from the pin body, the base and the arm being positioned to project from the bottom of the shed, and a recess having first and second engaging portions, and
   whereby when a plurality of said insulators are connected in a string the recess in said second insulator receives the base and the arm of the pin of the first insulator, wherein the first engaging portion of the second insulator engages the base of the pin of the first insulator to suspend the second insulator from the first insulator, and the second engaging portion of the second insulator engages the arm of the pin of the first insulator to prevent relative rotation between the first and second insulators.

2. An insulator according to claim 1, wherein the recess of the cap opens to a side, and whereby when a plurality of said insulators are connected in a string the arm of the pin of the first insulator is held in the second engaging portion of the second insulator.

3. An insulator according to claim 1 further comprising:
   an upper seal and a lower seal provided at opposing vertical ends of the bore hole for sealing the bore hole; and
   a wire for connecting the lower seal to the pin.

4. An insulator according to claim 3 wherein the arm further includes a connecting portion to which the wire is attached.

5. An insulator according to claim 4 wherein the wire has a connector at a first end thereof, the connecting portion of the arm being fastened to the connector by a screw.

6. An insulator for use in a suspension-type line arrester that supports a transmission line, the line arrester having a plurality of said insulators connected in a string, the insulator comprising:
   a body having a head and a shed formed integrally with the head, the shed having a bore hole therein;
   a resistor accommodated in the bore hole;
   a metal pin provided substantially at the center of the shed, the metal pin including a pin body, a base having a larger diameter than a diameter of the pin body, and an arm extending laterally from the pin body, the base and the arm projecting from the bottom of the shed; and
   a metal cap provided at the top of the head, the metal cap including a recess having first and second engaging portions, and
   whereby when a plurality of said insulators are connected in a string the base and the arm of the pin of a first one of the insulators are received by the recess in an adjacent second one of said insulators, wherein the first engaging portion of the second insulator engages the base of the pin of the first insulator to suspend the second insulator from the first insulator, and the second engaging portion of the second insulator engages the arm of the pin of the first insulator to prevent relative rotation between the first and second insulators.

7. An insulator according to claim 6 further comprising:
   an upper seal and a lower seal provided at opposing vertical end of the bore hole for sealing the bore hole; and
   a wire for connecting the lower seal to the pin.

8. An insulator according to claim 7 wherein the arm includes a connecting portion to which a first end of the wire is fastened.

9. An insulator according to claim 8, wherein the wire has a connector at its first end, the connecting portion being fasten to the connector by a screw.

10. An insulator according to claim 6, wherein a pair of bore holes are provided in the shed, the bore holes being position 180 degrees apart from each other in the shed; and
   the cap recess opens to the side in a manner such that the opening direction is perpendicular to a line connecting the bore holes, and the pin arm projects in the same direction as the opening direction.

* * * * *